United States Patent

[11] 3,571,785

[72] Inventor James A. Kozicki
 Warren, Mich.
[21] Appl. No. 870,886
[22] Filed Sept. 29, 1969
 Division of Ser. No. 635,518, May 2, 1967,
 Pat. No. 3,517,381.
[45] Patented Mar. 23, 1971
[73] Assignee Chrysler Corporation
 Highland Park, Mich.

[54] ELECTRICAL TERMINAL CONNECTION
 5 Claims, 4 Drawing Figs.
[52] U.S. Cl..................................................... 339/218,
 339/59, 339/223
[51] Int. Cl...................................................... H01r 9/08
[50] Field of Search............................................ 339/218,
 182, 183, 59, 60, 223, 256; 200/82; 340/52

[56] References Cited
UNITED STATES PATENTS
2,158,004 5/1939 Douglas........................ 339/204X
2,782,391 2/1957 Kirk............................. 339/211

Primary Examiner—Stephen J. Novosad
Assistant Examiner—Robert A. Hafer
Attorney—Talburt and Baldwin Harness ABSTRACT: Electrical circuitry for checking the operability of electrical connections and components of an electrical circuit and switch device adapted to energize a warning lamp in event of leakage in one fluid circuit of a two fluid circuit hydraulic brake circuit of a vehicle. Switch includes a housing having a piston movable to close switch in response to a predetermined pressure differential on opposite sides of piston. Electrical checking circuit passes through a molded electrical terminal connected at one end of one of the terminals of switch.

PATENTED MAR 23 1971　　　　　　　　　　3,571,785

INVENTOR.
James A. Kozichi

Harness, Talburtt & Baldwin

ATTORNEYS.

ELECTRICAL TERMINAL CONNECTION

This is a division of application Ser. No. 635,518, filed May 2, 1967, now Pat. No. 3,517,381.

BACKGROUND OF THE INVENTION

This invention relates to an electrical terminal connection, and more particularly to an electrical terminal connection for completing an electrical checking circuit through one terminal only of a two terminal switch adapted to close another electrical circuit through a signal device upon failure or malfunctioning of the braking system of an automotive vehicle.

Generally, automotive brake systems include a number of brake actuating devices, a fluid displacement mechanism or master cylinder, and a number of brake fluid circuits connecting the displacement mechanism with the brake actuating devices. However, a disadvantage of this type of brake system lies in the fact that a leak or break in one of the brake fluid circuits will allow the fluid in the whole system to drain therefrom, thereby rendering ineffective the entire brake system of the vehicle. To prevent such an occurrence, brake systems have been proposed which utilize a dual master cylinder with twin hydraulic fluid working chambers. One of the working chambers of the master cylinder is connected to the front wheel brakes to form a first brake circuit, while the other working chamber is connected to the rear wheel brakes to form a second independent brake circuit. Thus, if a leak should occur in one brake circuit, thereby rendering such circuit ineffective, the other brake circuit would remain effective when pressure is applied to the brake pedal. However, some vehicle operators do not detect any difference in vehicle braking even if only one brake circuit is operational. Accordingly, a signal has been built into the braking system to warn the operator in the event one of the brake circuits becomes ineffective. A number of hydraulic signal switch devices and signalling systems have been proposed. One signalling system employs a switch, located under the hood in front of the fire wall adapted to be closed when a predetermined pressure differential exists in the two hydraulic circuits and the brake pedal is depressed. One terminal of the switch is connected to an electrical line extending from the switch through the fire wall to an indicating device, such as a lamp, located on the instrument panel. The electrical line usually comprises two lengths of wire joined by a connector extending through the fire wall. A similar line may also extend from the lamp through the fire wall to ground. When the switch closes the lamp is energized to warn the vehicle operator of the damage to one of the hydraulic circuits. However, if the indicating device or lamp is defective or has burned out, or if one electrical connection through the fire wall is loose or broken, the lamp will not be energized when the brake pedal is depressed. Accordingly, the vehicle would not receive any signal that one of the hydraulic brake circuits is damaged. Heretofore, the connections between the switch and the remaining electrical circuit had to be manually and visually checked to insure that they were in operable condition. The present invention permits an electrical circuit to be completed through a terminal of the aforementioned switch, thereby permitting the signalling circuit to be checked to determine if the latter is in operable condition without manual and visual inspection of the connections.

SUMMARY OF THE INVENTION

Briefly, this invention comprises an electrical terminal connection for a switch in an electrical signal circuit for signalling hydraulic brake malfunction and parking brake application, the electrical terminal connection including a terminal having portions of different diameter, and a body having electrical conductor clamps therein connected to electrical conductors and surrounding the terminal portions, the terminal connection completing an electrical circuit for checking the operability of the electrical signal circuit connections and the signal component.

Accordingly, one of the primary objects of this invention is to provide an electrical terminal connection adapted to facilitate checking of the operability of components of an electrical signal circuit.

Another object of this invention is to provide an electrical terminal connection of the class described which permits the signal circuit components to be checked for operability in a simple and convention manner.

A further object of this invention is to provide such an electrical terminal connection such as described which is inexpensive and effective in operation.

Other objects and advantages of this invention will become apparent as the description progresses.

BRIEF DESCRIPTION OF THE DRAWINGS

In the accompanying drawings, in which one of various possible embodiments of this invention is illustrated.

Like parts are indicated by corresponding reference characters, throughout the several views of the drawings.

DESCRIPTION OF THE PREFERRED EMBODIMENT

Figure 1:
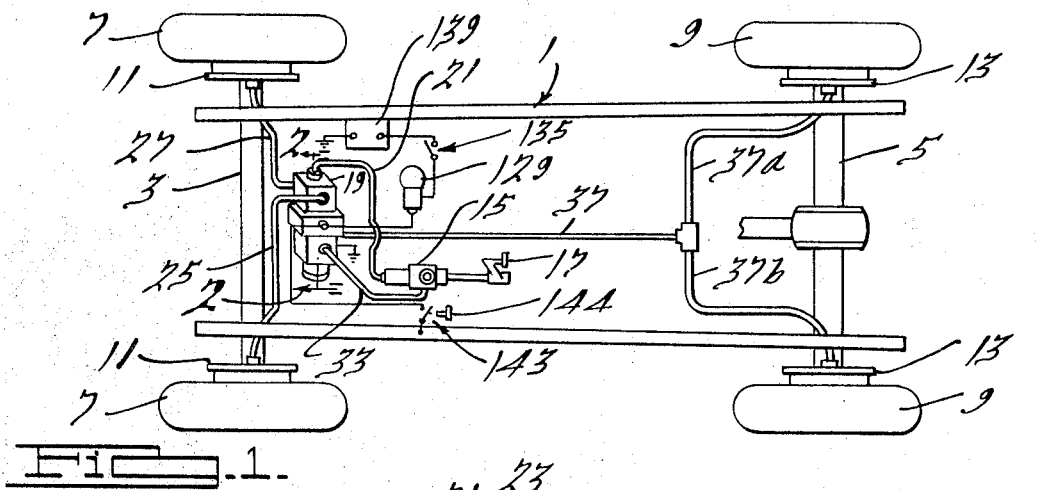
FIG. 1 is a plan view of the chassis of an automotive vehicle with a diagrammatical showing of the electric circuit in which the electrical terminal connection is employed.

Referring now to FIG. 1 of the drawings for a discussion of the environment for the electrical terminal connection of this invention, an automotive vehicle frame is indicated generally at 1. Attached to frame 1 are a front axle 3 and a rear axle 5 carrying front and rear wheels 7 and 9, respectively. Conventional hydraulic brake actuating assemblies 11 and 13 are respectively attached to the front and rear wheels and axles. The brake actuating assemblies function to brake the wheels when fluid is forced to them, and upon decrease of fluid pressure the assemblies function to force the fluid back toward its source, as is well-known.

A fluid displacement mechanism in the form of a tandem or dual master cylinder 15, such as disclosed in U.S. Pat. No. 3,149,468, for example, is attached to the frame in a suitable location. Master cylinder 15 is connected to and operated by a brake pedal 17. The dual master cylinder has two working chambers and is adapted to supply hydraulic brake fluid under pressure to the front brake actuating assemblies 11 by one circuit and to the rear brake actuating assemblies 13 by another circuit, both circuits passing through a housing 19, as will be made apparent hereinafter. One end of housing 19 is interconnected with the first brake circuit which includes a fluid conduit 21 connected between one of the master cylinder chambers and an inlet 23 on the housing. Fluid conduits 25 and 27 of the first circuit extend between outlet ports 29 and 31 in the housing 19 and the front brake actuating assemblies 11. The other end of housing 19 is interconnected with the second brake circuit which includes a fluid conduit 33 connected to the other master cylinder chamber and inlet 35 in the housing. A fluid conduit 37, including branches 37a and 37b, of the second fluid circuit, extends between an outlet 39 in the housing 19 and the rear brake actuating assemblies 13.

It will be understood that a depression of the pedal 17 causes fluid to be displaced in the master cylinder 15 thus forcing it through each of the master cylinder ports, the end portions of control housing 19, and to the front and rear wheel brakes 11 and 13. The master cylinder is provided with valve means (not shown) which in addition to allowing fluid passage in and out of the master cylinder, also, when the brakes are in unapplied condition, maintains a residual pressure in each of the brake circuits of about 10 pounds per square inch.

Figures 2, 3, 4:
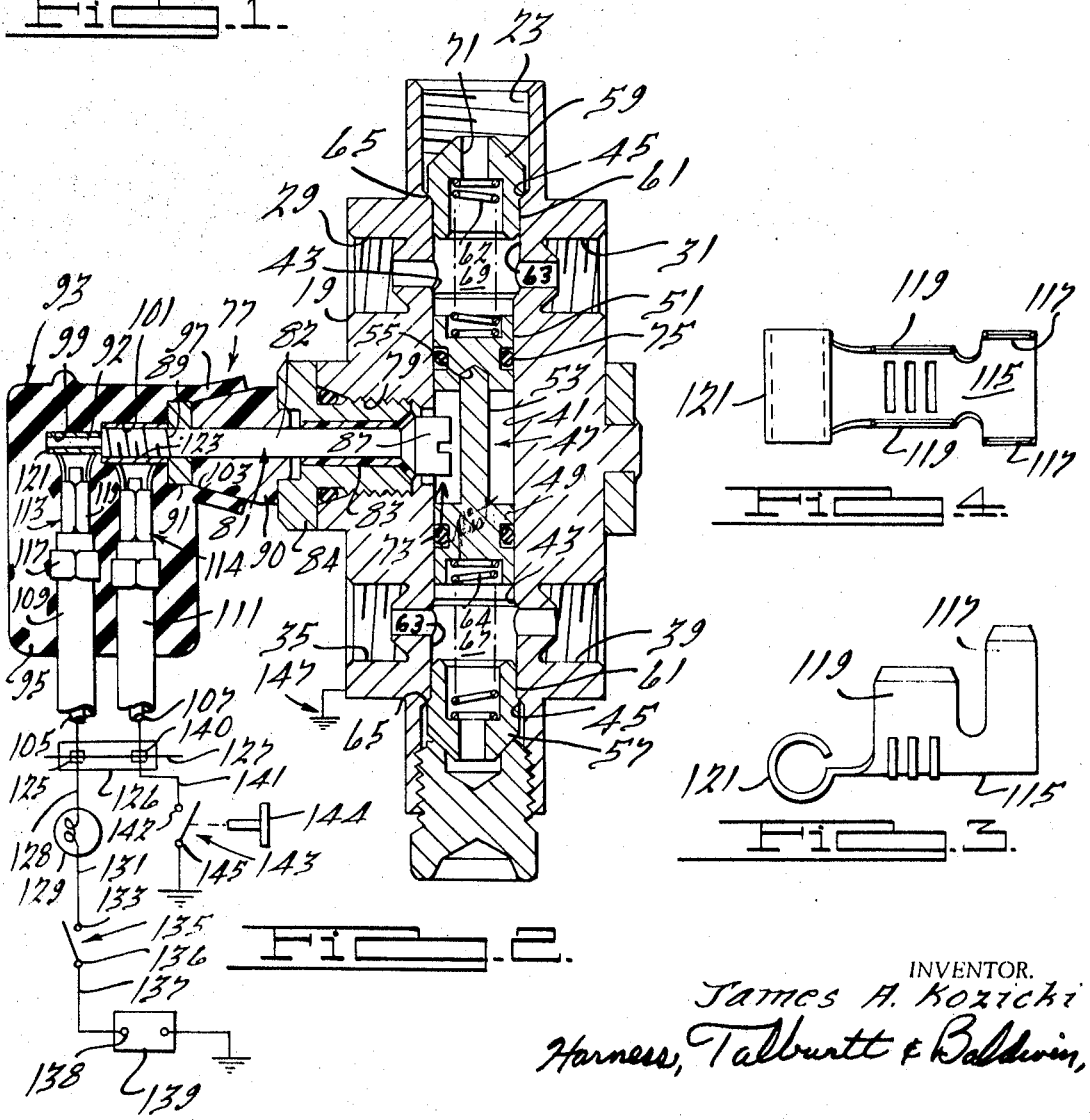
FIG. 2 is an enlarged section taken generally along line 2-2 of FIG. 1 and illustrating, on an enlarged scale, the terminal connection of this invention.
FIG. 3 is an enlarged side view of a terminal clamp forming part of the invention.
FIG. 4 is a plan view of FIG. 3.

As shown in FIG. 2, the housing 19 has a cylinder or bore 41 extending longitudinally therein. The bore 41 extends through the housing 19 and its central region is of smaller diameter than its intermediate end portion, thereby forming outwardly facing ledges 43. Likewise, the intermediate end portions are of smaller diameter than the ends of the bore thereby forming outwardly facing ledges 45. A piston or spool valve 47 is slidably mounted in the bore and has two spaced piston lands 49 and 51. For ease of assembly, the piston lands are and by means of an arm 53, extending from piston land 49, and having an end portion received in a recess 55 of piston land 51.

The end portions of bore 41 are provided with insert seals or plugs 57 and 59 which are pressed into the bore so that at least a portion of their outer peripheral surface 61 is in contact with a surface 63 of bore 41. Preferably, the insert seals have a tapered portion 65 which engages the outwardly faced ledges 45 of bore 41 to provide additional sealing surface. Springs 62 and 64 exert substantially equal and opposite forces on piston 47 to initially locate the latter in a central position in bore 41.

Insert seals 57 and 59 and piston lands 49 and 51 cooperate respectively, to define chambers 67 and 69. Communicating with chamber 69 are control housing outlet ports 29 and 31 which in conjunction with chamber 69 comprise a first passageway in an end portion of housing 19. Similarly, control housing inlet port 35 and outlet port 39 communicate with chamber 67 and together comprise a second passageway in the other end portion of housing 19.

As seen with reference to FIGS. 1 and 2, fluid conduits 25 and 27 are screw-threaded into engagement with ports 29 and 31, respectively, while fluid conduit 21 is threadably engaged with inlet 23. Communication between inlet 23 and chamber 69 is established by a port 71 in insert 59. Similarly, ports 35 and 39 of the opposite end portion of housing 19 are threadable engaged with fluid conduits 33 and 37. Accordingly, brake fluid in the first circuit enters housing 19 from fluid conduit 21, passes through insert seal port 71 and chamber 69, and is discharged from housing 19 via ports 29 and 31. Likewise, the other end portion of housing 19 is interconnected with the fluid conduits 33 and 37 of the second brake circuit so that brake fluid in the second circuit passes through chamber 67.

Piston lands 49 and 51, are provided with O-ring seals 73 and 75, respectively, on their outer peripheral surface which serve to prevent fluid from chambers 67 and 69 from entering the space between the piston lands.

An electrical switch assembly 77 is threadably received by a socket 79 in housing 19 so that an elongated terminal electrode 81 thereof projects into bore 41 and between the piston lands 49,51. Electrode 81 has a long shank portion 82, which forms part of this invention, and is isolated from contact with the housing 19 by means of insulator material 83 located between the shank portion 82 and the inside wall of a cylindrical plug 84. One end of the shank 82 is provided with a head portion 87 adapted to receive an adjusting tool, such as a screwdriver.

Shank portion 82 has a threaded portion 89 adapted to accommodate a tapered insulator 90 and nut 91. Threaded portion 89 is spaced from head 87 and has an extension 92 on the outer end thereof. Extension 92 has a smaller diameter and smaller cross-sectional area in a plane extending generally normal to its length than portion 89. An insulator 93 has a body portion 95 and a resilient sleeve 97 extending in a generally perpendicular direction from the side of the body adjacent one end of the latter. The insulator has a first bore 99, slightly larger in diameter than extension 92 and substantially the same length as the latter, a second bore or first counterbore 101, slightly larger in diameter than threaded portion 89, and a third bore or second counterbore 103, having a diameter which, when the sleeve 97 is in an unstressed condition, is approximately equal to the diameter of the outer end of insulator 90. The bore 103 forms the sleeve 97 which is adapted to stretched over the tapered insulator 90 as shown in FIG. 2.

Body 95 is adapted to receive two electrical wires 105 and 107 having insulation coverings 109 and 111, respectively, thereon. Contact between wires 105 and 107 and terminal shank 82 is established by terminal clamps 113 and 114, respectively. Terminal clamp 113 has an elongated channel portion 115 adapted to generally mate with and cradle the surface of insulation covering 109. A pair of arms 117 extends away channel portion 115 at one end of the latter. Arms 117 are crimped about the insulator covering 109 adjacent the end thereof. A second pair of arms 119 also extends away from channel portion 115. Arms 119 are crimped about the exposed end of the wire 105. A generally tubular-shaped contact portion 121 is provided at the end of channel portion 115 opposite to the location of arms 117 and extends in a direction substantially normal to the channel portion. The inside diameter of portion 121 is substantially the same as the diameter of terminal extension 92 and surrounds the latter in a contacting relationship. Portion 121 is approximately the same length as terminal extension and seats at one end on the shoulder provided at the end of threaded portion 89.

Terminal clamp 114 is generally similar to clamp 113, but tubular-shaped contact portion 123 (FIG. 2) has a larger diameter than the corresponding portion 121 of clamp 113, and is adapted to surround the contact threaded portion 89 of terminal or electrode 81. Clamp 114 is connected to wire 107 in the same manner as clamp 113 is connected to wire 105, i.e., arms 119 are crimped about the exposed end of the wire, while arms 117 are crimped about the insulator covering 111. The clamps are first secured to wires 105 and 107 and then the insulator 93 is molded around the wires and clamps to the shape shown in FIG. 2.

Wire 105 extends to a connection 125 of a bulkhead connector 126 located in the vehicle fire wall 127. A line 128 extends from the passenger side of connection 125 to a warning lamp 129. A line 131 extends from warning lamp 129 to one terminal 133 of an ignition switch 135. The other terminal 136 of switch 135 is connected by a line 137 to one terminal 138 of a power source, such as a battery 139.

Line 107 is connected to a connection 140 of bulkhead connector 126. An electrical line 141 extends from the passenger compartment side of connection 140 to one terminal 142 of a switch 143 adapted to be closed upon application of a parking brake actuator 144. The other terminal 145 of switch 142 is connected to ground. Housing 19 is also grounded as indicated at 147.

In normal operation, the master cylinder 19 the first brake circuit comprising conduits 21, 25 and 27 and chamber 69 of housing 19, and the second brake circuit comprising conduits 33, 37, 37a, and 37b and chamber 67 of housing 19, are completely filled with fluid which is under a residual pressure of about 10 pounds per square inch. Accordingly, piston 47 is maintained with respect to head portion 87 of electrode 81 in a position as shown in FIG. 2. Upon depression of brake pedal 17, the fluid pressure in each of the first and second circuits is built up to a relatively high pressure. Again, piston 81 will not move since the pressure on each of the piston lands 49,51 is substantially equal.

When through accident, or long use, a brake fluid conduit, for example, conduit 27, is broken or develops a leak, the pressure in the first brake circuit will be substantially less than the pressure in the second brake circuit. Accordingly, upon actuation of the master cylinder, the pressure exerted against piston land 49 will be much greater than the pressure on piston land 51 and, when the pressure differential is in the range of about 200 pounds per square inch, for example, piston 47 will move upwardly as viewed in FIG. 2 until piston land 49 contacts head portion 87 of electrode 81. Upon such contact, an electrical circuit will be completed from battery 99, through line 137, closed ignition switch 135, line 131, lamp 129, line 128, connection 125, line 105, terminal clamp 113, extension 92, shank portion 82, head 87, piston 47 and housing 19 to ground, thereby energizing signal lamp 129. When the operator releases the pedal 17, the pressure in the second circuit will drop to the normal residual pressure which will again be greater than the first circuit pressure which is exerted against piston land 51. However, piston 47 will substantially return to the position as illustrated in FIG. 2 since the force exerted thereon by spring members 62 and 64 is greater than the residual hydraulic fluid pressure acting on the piston, and signal lamp 129 will be inactivated.

However, if lamp 129 is defective or burned out, or if one of the terminal connections or one of the connections 125, 140 is loose or broken, the lamp may not be energized when the piston 47 contacts the head portion 87 on shank 81. Thus, the vehicle operator would not be given any warning signal if one of the hydraulic fluid lines were damaged.

The terminal connection of this invention permits the operability of the lamp 129 and various electrical connections to be checked without the necessity of going through the manual and visual procedure presently required and explained in the initial portion of this specification.

Testing of the circuitry is accomplished in the following manner:

The operator first closes the ignition switch 135. Then, the parking brake actuator 144 is set to close switch 143. If the lamp 129 is operable and the connections at 136, 133, the lamp, 125, 121, 123, 140, 142, 145 and ground are in operable condition, a circuit will be closed from battery 139 through line 137, switch 135, line 131, lamp 129, line 128, connection 125, line 105, terminal clamp 113, shank extension 92, threaded shank portion 89, terminal clamp 114, line 107, connection 140, line 141 and switch 143 to ground. Thus, lamp 129 will be energized thereby providing a visual indication to the vehicle operator that the lamp and electrical connections are in operable condition. If the lamp does not become energized when the parking brake actuator is actuated to close switch 143, the operator will know that the lamp is defective or burned out or that one or more of the electrical connections are not secure. The circuit can then be quickly checked to determine the trouble spot.

It will be noted that the terminal connection of this invention permits the electrical signalling apparatus to be quickly and conveniently checked for operability.

In view of the foregoing, it will be seen that the several objects and other advantages of this invention are accomplished.

Although only one embodiment of the invention has been disclosed and described, it is apparent that other embodiments and modifications of the invention are possible within the scope of the appended claims.

I claim:

1. A terminal connection for an electrical terminal comprising elongated first and second portions of said terminal, said first and second portions having different cross-sectional areas in planes extending substantially normal to the length of said portions, the cross-sectional area of said first portion being smaller than the cross-sectional area of said second portion, said first portion extending away from the end of said second portion, and a body having first and second terminal clamps therein, electrical lines in said body connected to said terminal clamps, said first and second terminal clamps also surrounding and contacting said first and second portions of said terminal for completing an electrical conducting path through said terminal.

2. A terminal as set forth in claim 1, said body having a first bore therein in which said first terminal clamp and said first terminal portion are nested, and a second bore, larger than said first bore, and located outwardly with respect to said first bore, in which said second terminal clamp and said second terminal portion are nested.

3. A terminal as set forth in claim 2, said body having a resilient sleeve portion extending outwardly from said second bore, said sleeve being stretched over adjacent portions of said signal switch for insulating the latter.

4. A terminal as set forth in claim 3, wherein said terminal clamps are molded in said body.

5. A terminal as set forth in claim 4, said terminal clamps include channel portions for cradling the end portions of said electrical lines, two pairs of arms extending away from each channel portion for physically and electrically clamping the respective electrical line to the respective terminal clamp, each of said terminal clamps further including a generally tubular-shaped portion extending in a direction substantially normal to the respective channel portion, the generally tubular-shaped portion of said first terminal clamp having an internal diameter approximately equal to the thickness of said first terminal portion, and the generally tubular-shaped portion of said second terminal clamp having an internal diameter approximately equal to the thickness of said second terminal portion.